United States Patent
Waterworth

[11] Patent Number: 6,026,735
[45] Date of Patent: Feb. 22, 2000

[54] SELF STIRRING COOKING ASSEMBLY

[76] Inventor: Ann Waterworth, 4902 Rincoh Rd., NW., AQ, N.Mex. 87105

[21] Appl. No.: 09/108,045

[22] Filed: Jun. 30, 1998

[51] Int. Cl.[7] .................................................. A47J 27/00
[52] U.S. Cl. ............................. 99/348; 366/205; 366/146
[58] Field of Search ..................... 99/348, 422; 366/146, 366/144, 316, 199, 205

[56] References Cited

U.S. PATENT DOCUMENTS

| | | | |
|---|---|---|---|
| 2,805,843 | 9/1957 | Block . | |
| 2,867,420 | 1/1959 | Potts | 366/146 |
| 3,005,399 | 10/1961 | Libson | 99/348 |
| 3,132,849 | 5/1964 | Kritikson . | |
| 3,357,685 | 12/1967 | Stephens | 366/282 |
| 4,417,506 | 11/1983 | Herbst et al. | 99/348 |
| 4,429,624 | 2/1984 | Linn | 99/348 |
| 4,763,567 | 8/1988 | Dalquist, III et al. | 99/323.5 |
| 4,856,910 | 8/1989 | Cuschera | 366/282 |
| 5,013,158 | 5/1991 | Tarlow | 366/251 |
| 5,201,263 | 4/1993 | Teng | 99/335 |
| 5,228,381 | 7/1993 | Virgilio et al. | 99/348 X |
| 5,271,673 | 12/1993 | Bohnet et al. | 366/245 |
| 5,372,422 | 12/1994 | Dubroy | 366/143 |
| 5,497,695 | 3/1996 | Canela | 99/335 |
| 5,617,774 | 4/1997 | La Velle et al. | 99/348 |

*Primary Examiner*—Reginald L. Alexander
*Attorney, Agent, or Firm*—Kenneth L Tolar

[57] ABSTRACT

A self stirring cooking assembly includes a U-shaped housing having a motor driven sleeve protruding from a horizontal cooking surface. A plurality of utensils are also provided each having a stirring arm therein mounted to a tubular plug protruding through the bottom of the utensil dimensioned to be received within the motor driven sleeve. Accordingly, any one of a plurality of interchangeable utensils may be placed on the housing to automatically heat and stir food items placed therein.

14 Claims, 2 Drawing Sheets

SELF STIRRING COOKING ASSEMBLY

BACKGROUND OF THE INVENTION

The present invention relates to a cooking assembly including a heating appliance capable of automatically rotating a stirring element in any one of several accompanying pots or pans to automatically stir contents therein for a predetermined period.

DESCRIPTION OF THE PRIOR ART

A variety of food mixtures must be continuously stirred during the cooking process to avoid scorching, burning or boiling over. A user must therefore repeatedly stir the food which is burdensome and inconvenient. A myriad of automatic stirrers for pots and pans exists in the prior art. For example, U.S. Pat. No. 3,357,685 issued to Stephens relates to a battery operated stirring unit which may be mounted across the top of a pan with a pair of extendable yokes.

U.S. Pat. No. 3,132,848 issued to Kritkson discloses a cooking utensil stirrer adaptable for various sized pots or pans. The stirrer portion includes a main support shaft having feet pivotally connected thereto allowing the stirring lengths to be varied.

U.S. Pat. No. 2,805,843 issued to Block relates to a stirring mechanism which may be clamped to the rim of a pot or pan.

U.S. Pat. No. 5,167,774 issued to LaVelle et al discloses a self stirring cooking device comprising a motor assembly/stirrer attachable to a pot or pan handle.

U.S. Pat. No. 4,856,910 issued to Cushera relates to a stirring apparatus which may be clamped to opposing portions of a container rim. The device includes a cross beam which spans the container and has clamps to secure the cross beam to opposing portions of a pot rim. A stirrer shaft extends downwardly from the cross beam and has a plurality of stirring blades thereon. An electrical motor is mounted on the beam to drive the stirrer.

U.S. Pat. No. 5,013,158 issued to Tarlow discloses a selfstirring vessel having a stirrer powered by a motor mounted within its cover. The device further includes a timer for actuating the motor for a predetermined duration.

Each of the above described devices has several disadvantages. The conventional devices relate to a pot or pan having an integral or attachable self powered stirring arm. With the pans having integral stirrers, the motor driven stirrer is limited to its designated pot or pan and is also heavy and cumbersome to manipulate. Likewise, the devices which are attachable to a pot or pan are burdensome and inconvenient.

The present invention provides a heating appliance adapted to interchangeably receive a plurality of pots and pans each having a uniquely designed stirring arm therein. The stirring arm is rotatable with a motor received within the appliance eliminating the need to integrate or attach a motor to the pot or pan. The stirring arm includes a horizontal blade portion adjacent the bottom of the pan with upwardly depending paddles at each end that extend to just below the top edge of the pan to assure uniform mixing.

SUMMARY OF THE INVENTION

The present invention relates to a cooking assembly for use with a plurality of interchangeable pots or pans each having a stirring arm therein. The device comprises a heating appliance having a housing with a hollow, horizontal bottom portion and a pair of opposing side walls vertically depending therefrom. Received within the bottom portion is an electric motor that rotates a drive shaft. The drive shaft has a cylindrical sleeve on its top end that protrudes through an opening on the housing bottom portion. One or more heating elements are disposed immediately beneath the horizontal portion for heating a pot or pan resting thereon. The top terminal edge of a first side wall has an indention for receiving a pot or pan handle. A plurality of utensils such as pots and pans are also provided each having a select size or style. Each pot or pan includes a circular horizontal bottom wall with a cylindrical side wall vertically extending therefrom, the area between which defines a food receptacle. Received within the food receptacle is a stirring arm including a horizontal blade having a paddle vertically depending from each of two opposing ends thereof. Each paddle extends along the vertical side wall to a point proximal a top edge thereof to ensure a thorough and complete mixing when rotated. The horizontal blade portion is mounted on a rotatable tubular plug member dimensioned to be received within the motor driven sleeve on the housing. Accordingly, any one of a plurality of pots or pans may be interchangeably placed in the housing to provide a self stirring cooking assembly. It is therefore an object of the present invention to provide a self stirring cooking assembly interchangeably useable with a plurality of pots and pans.

It is yet another object of the present invention to provide a self stirring cooking assembly that assures adequate mixing of food items therein.

It is yet another object of the present invention to provide a self stirring cooking assembly that is versatile and convenient to use. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
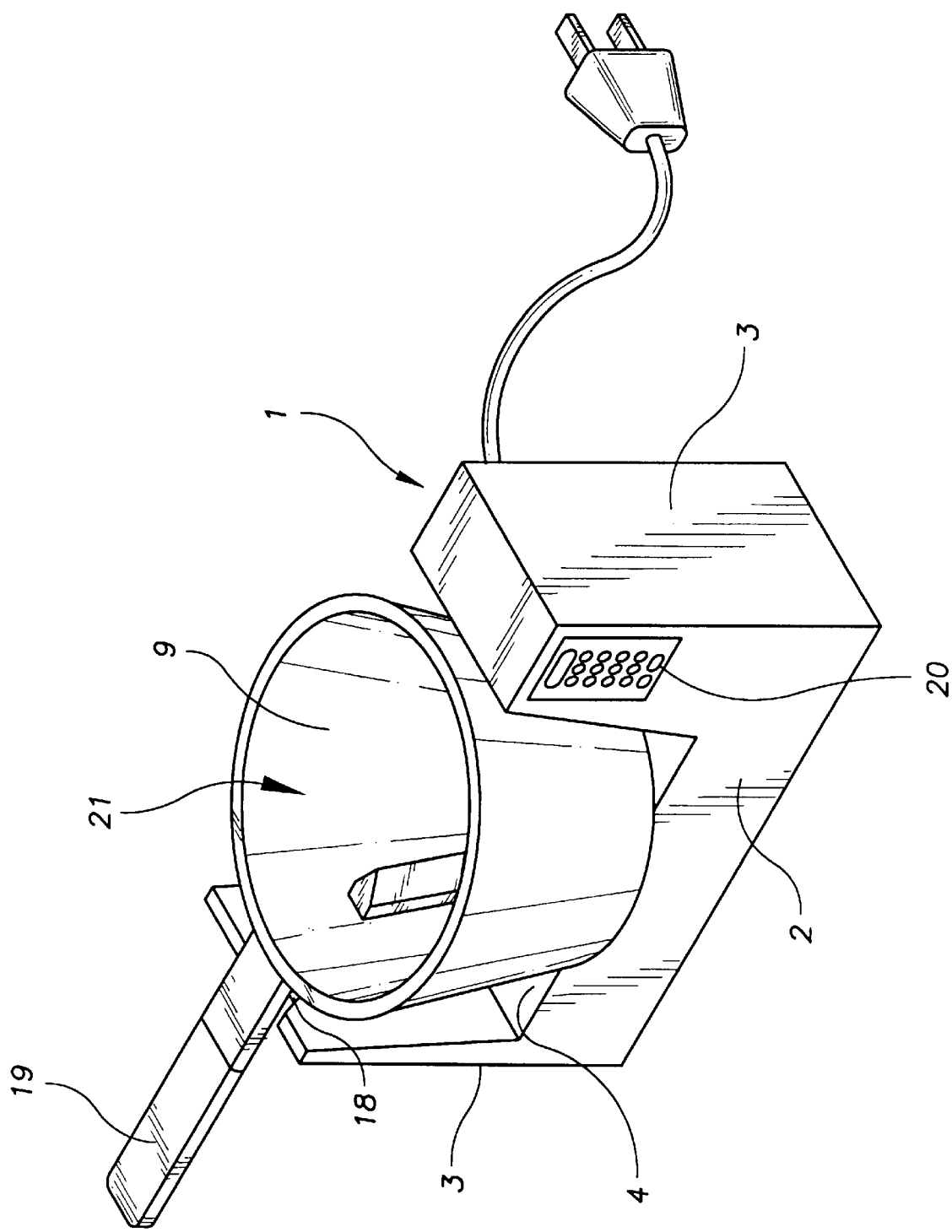
FIG. 1 is a perspective view of the inventive device.
Figure 2:
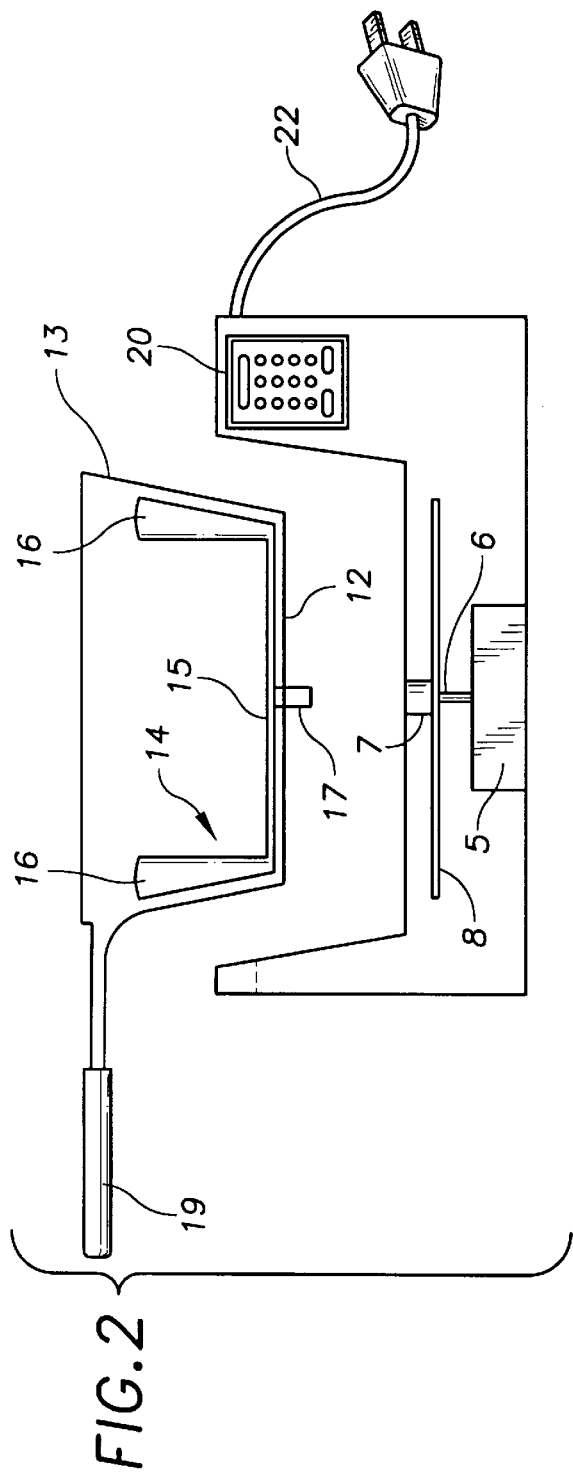
FIG. 2 is a side view of the inventive device depicting the internal components of the housing.
Figure 3:
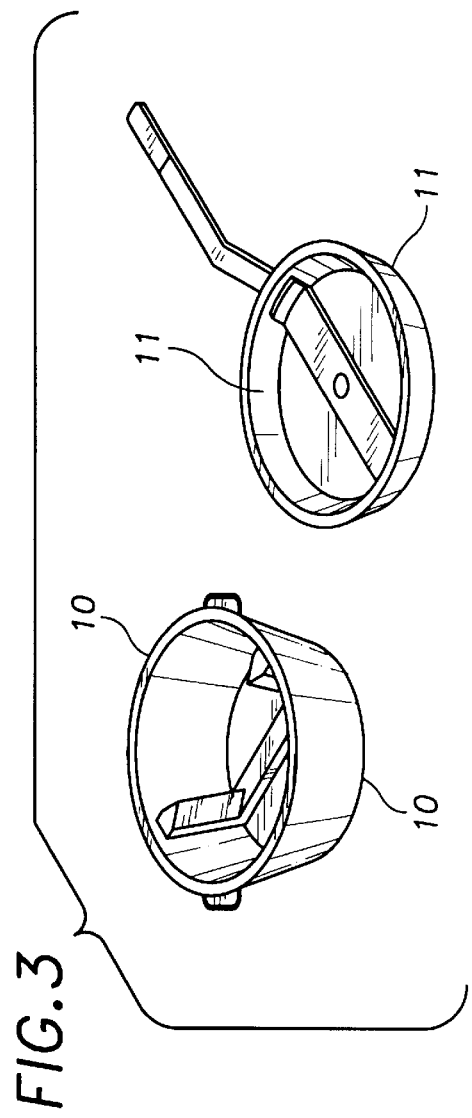
FIG. 3 depicts a pair of accompanying cooking utensils according to the present invention.

Referring now to FIGS. 1 through 3, the present invention relates to a self stirring cooking assembly. The device comprises a heating appliance including a substantially U-shaped housing 1 having a horizontal, hollow bottom portion 2 with two vertical side walls 3 depending from opposing ends thereof. The upper exterior surface of the horizontal portion defines a cooking surface 4.

Received within the horizontal portion of the housing is a variable speed motor 5 which rotatably drives a vertical shaft 6 extending upwardly therefrom. Attached to the top distal end of the shaft is a cylindrical sleeve 7 that protrudes through an opening on the cooking surface. Immediately beneath the cooking surface and within the housing are one or more heating coils 8 for heating a pot or pan resting thereon.

The top terminal edge of a first side wall has an indention 18 for receiving a utensil handle 19 of the type described in more detail below to stabilize the utensil when placed on the cooking surface. A key pad 20 is disposed on the second side wall of the housing and is in communication with conventional timer circuitry as well as the motor for activating the motor at select times of day or for predetermined durations. The key pad may also be used to vary the intensity of the heating coils. An electrical cord 22 is provided to power the motor and control circuitry.

A set of cooking utensils 9 such as a pot 10 or pan 11 is also provided. Each pot or pan according to the present invention includes a horizontal circular bottom wall 12 with a continuous cylindrical side wall 13 vertically depending therefrom. The area between the cylindrical side wall and circular bottom wall define a receptacle 21 for receiving food items. Extending horizontally from the cylindrical side wall is an integral handle 19.

Received within the receptacle is a stirring arm 14 including a horizontal blade member 15 disposed immediately adjacent the circular bottom wall. Vertically depending from each end of the blade member is an elongated, substantially wedge shaped paddle 16 that extends upwardly along the cylindrical side wall to a portion proximal its top terminal edge. The vertical paddles provide a stirring action along the outer periphery of the receptacle, from top to bottom, to ensure uniform mixing. Attached to the bottom surface of the blade member and protruding through the circular bottom wall of the utensil is a rotatable tubular plug member 17 dimensioned to be securely received within the cylindrical sleeve on the housing cooking surface. Each utensil may relate to any variety of pots or pans having various dimensions and styles.

To use the above described device, a select utensil is placed on the cooking surface with its tubular plug member received within the cylindrical sleeve. The desired food items are placed into the utensil. The motor speed, heating intensity of the coils and stirring duration are preprogrammed using the externally mounted keypad. Accordingly, the items being heated or cooked within the utensil will be automatically stirred for the selected duration.

The housing is preferably constructed with ceramic or similar heat resistant materials. The utensils according to the present invention are preferably constructed with metal or glass. However, as will be readily apparent to those skilled in the art, the size, shape and materials of construction of the various components according to the present invention may be varied without heating intensity are all conventional components and are therefore not described nor depicted in detail.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A self stirring cooking assembly comprising:
   a housing including a hollow horizontal portion having an upper surface which defines a cooking surface;
   a cooking utensil, said utensil including a bottom wall and a side wall the area between which define a receptacle for receiving food items;
   a stirring arm received within said receptacle, said stirring arm including a horizontal blade immediately adjacent the bottom wall of said utensil, said horizontal blade having a pair of opposing ends with an elongated paddle vertically extending from each end, each elongated paddle extending to approximately a top edge of the utensil side wall to provide uniform mixing throughout said receptacle;
   means for automatically rotating said stirring arm when said utensil is placed on the housing cooking surface.

2. A device according to claim 1 wherein said means for rotating said stirring arm comprises:
   an electrical, variable speed motor received within the horizontal portion of said housing;
   a cylindrical sleeve rotatably driven by said motor, said sleeve protruding through an opening on the cooking surface;
   a tubular plug attached to said stirring arm and extending through the circular bottom wall of said utensil, said tubular plug dimensioned to be received within said cylindrical sleeve.

3. A device according to claim 1 wherein said housing further comprises a pair of side walls vertically depending from the horizontal portion thereof, a first side wall having an indention on its top terminal edge for receiving said utensil handle to stabilize said utensil when resting on the cooking surface.

4. A device according to claim 1 further comprising an intensity variable heating element received within said horizontal portion of said housing and disposed immediately below the cooking surface.

5. A device according to claim 1 further comprising a timer means for selectively varying the operating duration of said blade rotating means.

6. A device according to claim 1 further comprising a control means for selectively varying the speed of said motor.

7. A device according to claim 1 further comprising a control means for selectively varying the intensity of said heating element.

8. A self stirring cooking assembly comprising:
   a housing including a hollow horizontal portion having an upper surface which defines a cooking surface;
   a cooking utensil having a bottom surface with a side wall vertically depending therefrom, the area between which defines a receptacle for receiving food items;
   a handle extending from said utensil;
   a stirring arm received within said receptacle;
   means for automatically rotating said stirring arm when said utensil is placed on the housing cooking surface;
   a pair of side walls vertically depending from the horizontal portion of said housing, each side wall having a top edge, at least one of said top edges having an indention thereon for receiving said utensil handle to stabilize said utensil when resting on the cooking surface.

9. A device according to claim 8 wherein said means for rotating said stirring arm comprises:
   an electrical, variable speed motor received within the horizontal portion of said housing;
   a cylindrical sleeve rotatably driven by said motor, said sleeve protruding through an opening on the cooking surface;
   a tubular plug attached to said stirring arm and extending through the circular bottom wall of said utensil, said tubular plug dimensioned to be received within said cylindrical sleeve.

10. A device according to claim 8 further comprising on intensity variable heating element received within said horizontal portion of said housing and disposed immediately below the cooking surface.

11. A device according to claim 8 wherein said stirring arm comprises a horizontal blade immediately adjacent the bottom wall of said utensil, said horizontal blade having a pair of opposing ends with an elongated paddle vertically extending from each end.

12. A device according to claim 8 further comprising a timer means for selectively varying the operating duration of said blade rotating means.

13. A device according to claim 8 further comprising a control means for selectively varying the speed of said motor.

14. A device according to claim 8 further comprising a control means for selectively varying the intensity of said heating element.

* * * * *